Dec. 26, 1967  H. SABET  3,359,951
SEALING DEVICE
Filed Oct. 22, 1965  2 Sheets-Sheet 1
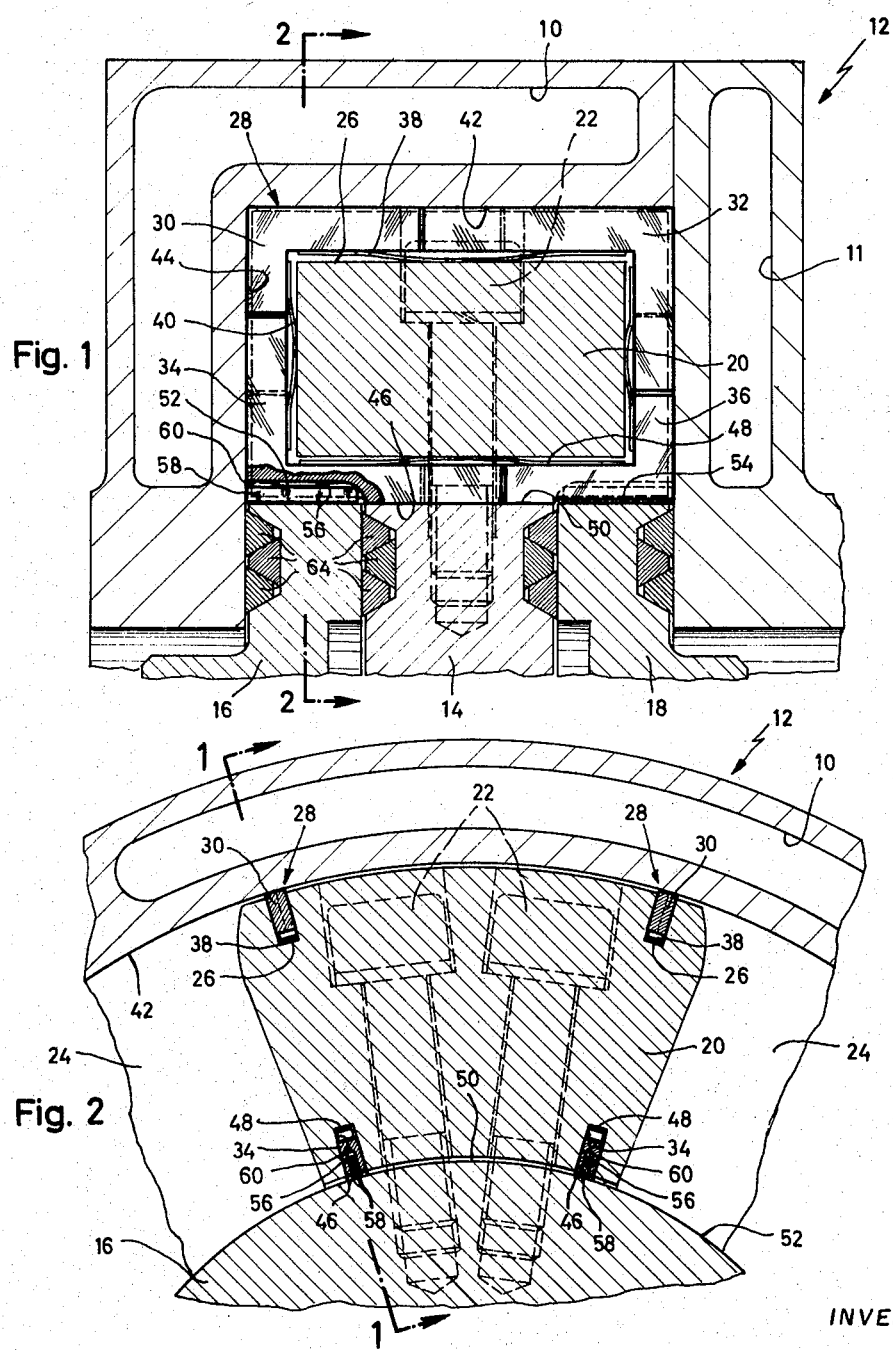
INVENTOR
Huschang Sabet
BY Spencer & Kaye
ATTORNEYS Dec. 26, 1967 H. SABET 3,359,951
SEALING DEVICE
Filed Oct. 22, 1965 2 Sheets-Sheet 2
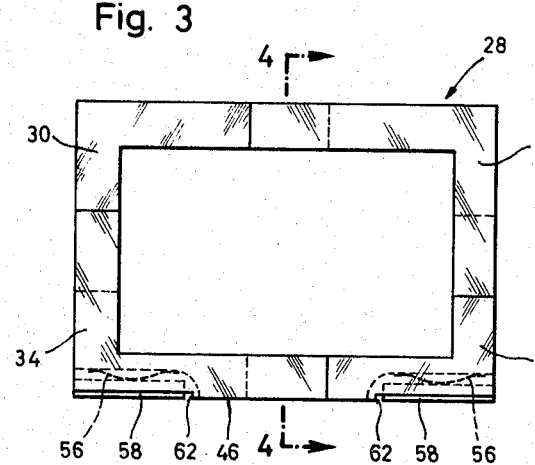
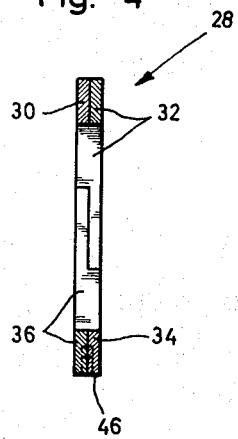
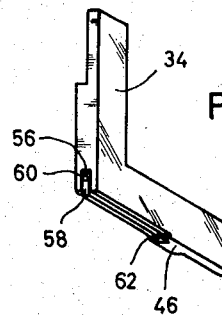
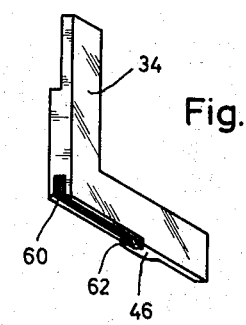
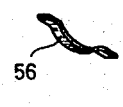
INVENTOR
Huschang Sabet
BY Spencer & Kaye
ATTORNEYS

United States Patent Office 3,359,951
Patented Dec. 26, 1967

3,359,951
SEALING DEVICE
Huschang Sabet, Eduard-Pfeiffer-Strasse 67,
Stuttgart, Germany
Filed Oct. 22, 1965, Ser. No. 501,887
Claims priority, application Germany, Nov. 5, 1964,
S 94,044
7 Claims. (Cl. 123—8)

ABSTRACT OF THE DISCLOSURE

In a rotary piston engine having two relatively rotatable hub parts and a vane rigidly connected to one hub part, a sealing arrangement composed of a sealing device surrounding the vane and having an edge facing the surface of, and parallel to the axis of rotation of, that hub part which is rotatable with respect to the vane, and a sealing element disposed in a groove in that edge of the sealing device which is parallel to the axis of rotation of the hub part and lying against the adjacent hub part surface.

---

The present invention relates generally to the sealing art and, more particularly, to a sealing device for the pistons of internal combustion engines having rotary pistons which rotate about a central axis.

More particularly, the present invention relates to a sealing device which is arranged in the groove of a piston of a rotary piston internal combustion engine, especially a sealing device of the type which is composed of several sealing strips, which bear against the peripheral surfaces of at least two hub portions which can be rotated with respect to each other, and with one of the hub portions being fixedly connected with the piston.

It has already been proposed to construct such a sealing device in the region of the hub portions of overlapping sealing strips. Such sealing devices, however, bring with them, as in the case of sealing devices arranged in the region of the hub portion of a one-piece sealing device, the drawback that the sealing strips, or the one-piece sealing device as the case may be, tilt or cant when one or more of the hub parts moves radially. Another drawback is that such sealing strip or sealing device may lift itself off entirely from one of the hub parts, and this results in undesired compression losses and hence reduces efficiency of the machine. It is, however, not possible to avoid radial play of at least one of the hub parts inasmuch as at least one hub part must be mounted so as to be rotational with respect to the other. For example, this may be accomplished by means of rollers bearings on a working shaft which is fixedly connected with one of the hub parts. Thus, it is not possible to avoid there being some radial play of the two hub parts with respect to each other, this play corresponding to that which is afforded by the bearing.

It is, therefore, the primary object of the present invention to provide sealing means for pistons or vanes connected to the hub part of rotary piston internal combustion engines, by means of which the combustion chamber is sealed better in the region of the hub parts.

Another object is to provide a sealing device in which proper sealing is provided even when one hub part moves radially with respect to another hub part.

These objects and others ancillary thereto are accomplished in accordance with preferred embodiments of the invention wherein the sealing device provided in the portion of the piston which engages the hub periphery is slotted where it passes over one of the hub parts. A sealing insert is slidably mounted in such slot and engages the periphery of the one hub part so that this one hub part may move radially with respect to the other and still form a proper seal.

Additional objects and advantages of the present invention will become apparent upon consideration of the following description when taken in conjunction with the accompanying drawings in which:

FIGURE 1 is a sectional view, taken substantially along the plane defined by reference line 1—1 of FIGURE 2, of a piston of a rotary piston internal combustion engine, as well as through the structure of the internal combustion engine which surrounds this vane, FIGURE 1 being seen in a plane which is at right angles to the direction in which the vane moves.

FIGURE 2 is a sectional view taken substantially along the plane defined by reference line 2—2 of FIGURE 1.

FIGURE 3 is a plan view of one embodiment of a sealing device according to the present invention.

FIGURE 4 is a sectional view taken on line 4—4 of FIGURE 3.

FIGURE 5 is a perspective view of a sealing strip of the sealing device, together with an inset sealing element.

FIGURE 6 is a perspective view similar to that of FIGURE 5 except that the sealing element is omitted.

FIGURE 7 is a perspective view of a leaf spring which acts on the insert sealing element.

FIGURE 8 is a perspective view of the sealing element.

With more particular reference to the drawings, and first to FIGURES 1 and 2 thereof, the same show a multiple-piece engine housing 12 of a rotary piston internal combustion engine. The housing has hollow chambers 10 and 11 that are filled with a coolant. The internal combustion engine further has a central hub part 14 which is keyed with a drive shaft (not shown), as well as two lateral hub parts 16 and 18 which are rotatably mounted on the drive shaft by means of needle bearings (not shown).

The internal combustion engine further comprises two pistons which are arranged diametrically opposite each other with respect to the drive shaft. One of these pistons, or so-called vanes, is shown at 20, and is connected to the central hub part 14 by means of screws 22. Also provided are two further vanes which are mounted on the two lateral hub parts 16 and 18. These two last-mentioned vanes are not shown but they, together with the other two vanes, form four combustion chambers 24, of which FIGURE 2 shows part of two of the combustion chambers, namely, the two combustion chambers located on opposite sides of the vane 20.

The vane 20 is provided with grooves 26 which extend about the entire periphery of the vane. Arranged within the grooves 26 are the sealing devices, indicated generally at 28. Each sealing device includes four overlapping angled sealing strips 30, 32, 34, 36, shown in more detail in FIGURES 3, 4, 5 and 6 and which, under the action of leaf springs 38 and 40 as well as the gas pressure in the combustion chambers 24, are sealingly pressed against the surfaces 42 and 44 of the motor housing 12. The edges 46 of the sealing strips 34 and 36, which are directed against the hub parts 14, 16 and 18, are pressed by the leaf spring 48 as well as the gas pressure against the peripheral surface 50 of the central hub part 14 which itself is fixedly connected with the drive shaft and the vane piston 20.

Also provided are small sealing plates 58, shown in detail in FIGURE 8, which are set into grooves 60 of the strips 34 and 36. These plates 58 lie in sealing engagement with the peripheral surfaces 52 and 54 of the lateral hub parts 16 and 18 which, due to the fact that they are mounted on the drive shaft by means of needle bearings, have a radial play with respect to the central hub part 14. The plates 58 lie against the surfaces 52 and 54 under the effect of the gas pressure and of leaf springs 56, shown in detail in FIGURE 7.

As shown in FIGURES 1, 3, 5 and 6, the sealing strips 34 and 36 are somewhat reduced in the radial direction of the hub parts 16 and 18 in the region of the grooves 60, so that their edges 46 form steps 62. This is necessary inasmuch as the hub parts 16 and 18 can, with respect to the central hub part 14, also have a radially directed outward play of the order of magnitude of the play afforded by their bearings. In this way, the lateral hub parts 16 and 18 will be prevented from raising the sealing strips 34 and 36 from the peripheral surface 50 of the central hub part 14.

With the vane pistons which are connected to the two lateral or outside hub parts 16 and 18, there is provided a sealing device which is comparable to the sealing device 28. This sealing device is arranged in a groove of the piston which lies opposite the peripheral surfaces of the hub, and is formed by two angled sealing strips that correspond to the above-described angled sealing strips 34 and 36. A sealing plate comparable to the sealing plate 58 is disposed in a groove in the sealing device which is opposite the peripheral surface 50 of the central hub part. As a result, the two sealing strips as well as the sealing element which serves for sealing with respect to the central hub part 14 become shiftable, independently of each other, in radial direction of the hub parts.

The hub parts are also provided with conventional sealings rings 64 in order to seal the spaces enclosed by the surfaces 42 and 44 as well as the hub parts 14, 16 and 18.

It will thus be seen that, in accordance with the present invention, there is provided a sealing arrangement in which there is provided, in the piston in the region of the peripheral surface of at least one of the hub parts, a groove which is parallel to the axis of this hub part, within which grooves there lies a sealing element that bears against this surface and this sealing element is rod-shaped or strip-like. Such sealing arrangement then lies against one of the hub parts so as sealingly to engage the same under the effect of the gas pressure and particularly of a spring. In the region of the adjacent hub part, a rod or strip-like sealing element, which also is under the gas pressure and also preferably under the influence of a spring and which is partly inserted into the sealing device, takes care of the sealing with respect to the peripheral surface of this hub part.

In order to make it possible to compensate for radial movement of a hub part in both directions of its radius with respect to a hub part, adjacent thereto and having a fixed axis, it is particularly advantageous if the sealing device is, in the region of the groove, reduced in radial direction of this hub part such that the surfaces of the sealing element which are directed toward the hub parts form a step.

It will be understood that the above description of the present invention is susceptible to various modifications, changes and adaptations, and the same are intended to be comprehended within the meaning and range of equivalents of the appended claims.

What is claimed is:

1. In an arrangement for a rotary piston internal combustion engine having a central axis, at least one vane piston, a plurality of hub parts, and a sealing device of several sealing strips arranged in a groove of the vane piston and pressed against the peripheral surfaces of at least two hub parts rotatable with respect to each other and one of which is fixedly connected with the vane piston, the improvement wherein the sealing device is provided with at least one groove in the region of the peripheral surface of at least one of the hub parts which groove is parallel to the axis of this hub part, and wherein said arrangement comprises a further sealing element disposed in said sealing device groove and lying against the peripheral surface.

2. A combination as defined in claim 1 wherein said sealing element is strip-like.

3. A combination as defined in claim 1 wherein said sealing element contacts the peripheral surface of the hub part which is rotatable with respect to the vane.

4. A combination as defined in claim 1 wherein the sealing device in the region of said groove is reduced in the radial direction of the hub parts so that the surfaces of the sealing device which are directed toward the hub parts form a step.

5. A combination as defined in claim 1, wherein there are three adjacent hub parts, the vane piston being connected to the central vane part, and there are two spaced grooves in the sealing device and two sealing elements disposed therein, said grooves being disposed in the region of the two outer hub parts.

6. A sealing device for use in a rotary piston internal combustion engine having a central axis and having at least one vane piston, and hub parts rotatable with respect to each other and to one of which the vane piston is connected, said device comprising in combination a sealing assembly including a plurality of sealing strips arranged to be disposed in a groove of such vane piston and pressed against the peripheral surfaces of at least two hub parts of a rotary piston engine, at least one said sealing strip being provided with a groove assembly disposed in the region of the peripheral surface of one of the hub parts and parallel to the axis of the one part; and a strip-like sealing element disposed in said sealing strip groove and contacting such peripheral surface.

7. A combination as defined in claim 1 wherein said sealing element is rod-like.

References Cited

UNITED STATES PATENTS 611,493   9/1898   Krogstad.

FOREIGN PATENTS 1,006,690   10/1965   Great Britain.

RALPH D. BLAKESLEE, *Primary Examiner.*

MARK M. NEWMAN, *Examiner.*